United States Patent
Everhart et al.

(10) Patent No.: US 10,523,573 B2
(45) Date of Patent: *Dec. 31, 2019

(54) DYNAMIC RESOURCE ALLOCATION BASED UPON NETWORK FLOW CONTROL

(71) Applicant: NetApp Inc., Sunnyvale, CA (US)

(72) Inventors: Craig Fulmer Everhart, Pittsburgh, PA (US); Vishwajith Shivappa, Milpitas, CA (US)

(73) Assignee: NetApp, Inc., Sunnyvale, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/848,840

(22) Filed: Dec. 20, 2017

(65) Prior Publication Data

US 2018/0159783 A1    Jun. 7, 2018

Related U.S. Application Data

(63) Continuation of application No. 14/842,086, filed on Sep. 1, 2015, now Pat. No. 9,917,784.

(Continued)

(51) Int. Cl.
*G06F 15/173* (2006.01)
*H04L 12/825* (2013.01)
(Continued)

(52) U.S. Cl.
CPC ............ *H04L 47/25* (2013.01); *G06F 9/5011* (2013.01); *H04L 67/1097* (2013.01)

(58) Field of Classification Search
CPC ..... H04L 47/25; H04L 67/1097; G06F 9/5011
(Continued)

(56) References Cited

U.S. PATENT DOCUMENTS 9,081,623 B1    7/2015 Magerramov et al.
2005/0262244 A1*  11/2005 Smyth ................ H04L 43/0811
                                                                709/226

(Continued)

OTHER PUBLICATIONS

Non-Final Office Action cited in U.S. Appl. No. 14/842,086 dated Jun. 26, 2017, 14 pgs.

(Continued)

*Primary Examiner* — Wing F Chan
*Assistant Examiner* — Joseph R Maniwang
(74) *Attorney, Agent, or Firm* — Cooper Legal Group, LLC

(57) ABSTRACT

One or more techniques and/or devices are provided for dynamic resource allocation based upon network flow control. For example, a first counter, corresponding to a count of communication availability signals provided by a network interface to a storage process, may be maintained. A second counter, corresponding to a count of communication unavailability signals provided by the network interface to the storage process, may be maintained. Responsive to the first counter exceeding a resource allocation threshold, additional resources may be dynamically allocated to the storage process during operation of the storage process. Responsive to the second counter exceeding a resource deallocation threshold, resources may be dynamically deallocated from the storage process during operation of the storage process. In this way, resources allocation for the storage process may be dynamically adjusted based upon real-time network flow control information indicative of whether the storage process is efficiently utilizing network communication channel availability.

20 Claims, 11 Drawing Sheets

Related U.S. Application Data

(60) Provisional application No. 62/199,735, filed on Jul. 31, 2015.

(51) Int. Cl.
*H04L 29/08* (2006.01)
*G06F 9/50* (2006.01)

(58) Field of Classification Search
USPC .......................................................... 709/226
See application file for complete search history.

(56) References Cited

U.S. PATENT DOCUMENTS

| | | | |
|---|---|---|---|
| 2010/0094999 A1* | 4/2010 | Rama | G06F 9/4843 709/225 |
| 2012/0215937 A1 | 8/2012 | Myrah et al. | |

OTHER PUBLICATIONS

Reply Non-Final Office Action cited in U.S. Appl. No. 14/842,086 dated Sep. 26, 2017, 12 pgs.
Notice of Allowance cited in U.S. Appl. No. 14/842,086 dated Nov. 1, 2017, 21 pgs.
Int. Search Report/Written Opinion cited in PCT Application No. PCT/US2016/044690 dated Oct. 20, 2016, 10 pgs.

\* cited by examiner

DYNAMIC RESOURCE ALLOCATION BASED UPON NETWORK FLOW CONTROL

RELATED APPLICATION

This application claims priority to and is a continuation of U.S. patent application Ser. No. 14/842,086, titled "DYNAMIC RESOURCE ALLOCATION BASED UPON NETWORK FLOW CONTROL" and filed on Sep. 1, 2015, which claims priority to U.S. Provisional Application No. 62/199,735, titled "DYNAMIC RESOURCE ALLOCATION BASED UPON NETWORK FLOW CONTROL" and filed on Jul. 31, 2015, which are incorporated herein by reference.

BACKGROUND

A storage network environment may comprise one or more storage computing devices (e.g., a storage controller, a node, a storage server, etc.) configured to provide clients with access to user data stored across one or more storage devices. A storage computing device may host various storage processes configured to process and/or transmit data from the storage computing device to a destination storage computing device. For example, a snapshot storage process may be configured to create snapshots of a volume of data hosted by the storage computing device, where a snapshot corresponds to a point in time representation of files and directories of the volume. A storage replication process may be configured to format a snapshot into a format that can be transmitted from the storage computing device to the destination storage computing device for backup and/or failover recovery purposes. For example, the destination storage computing device may utilize the snapshot to keep a mirrored volume, hosted at the destination storage computing device and corresponding to a replication of the volume hosted by the storage computing device, in an up-to-date state so that the mirrored volume may be used to provide failover client access to mirrored user data in the event the storage computing device fails. The maintenance of a remote mirrored volume may require networking communication. In order to use the networking communication bandwidth efficiently, these storage processes may do some other computations. For example, a storage process may compress the data being communicated over a network, in order to better utilize the available network bandwidth. Such processes may require the use of auxiliary computing resources.

Computing resources of the storage computing device, such as memory, CPU cycles, etc., may be allocated for use by a storage process. For example, an amount of primary memory may be allocated for the storage replication process to utilize as a cache. Amounts of computing resource allocation may be specified based upon theoretical performance estimates for a given hardware configuration or a history of resource utilization. Unfortunately, too many resources or too little resources may be allocated, which may affect performance of the storage process and/or other processes hosted by the storage computing device. If too many resources are allocated to the storage process and go unused, then other processes may provide diminished performance than if such processes had access to the unused resources. If not enough resources are allocated to the storage process, then the storage process may not produce data fast enough to keep up with available bandwidth for transmitting the data, and thus network bandwidth may be underutilized. Resource allocation estimation may be imprecise and may result in inefficiencies, such as wasted resources and/or underperforming processes due to a lack of adequate resources, because a variety of changing factors may affect how many resources a storage process may fruitfully utilize (e.g., if resources are allocated to a storage process based upon a relatively high bandwidth of a network card, then the storage process may utilize less resources than expected due to a relatively lower network throughput of a network communication channel compared to the throughput of the network card).

DETAILED DESCRIPTION

Figure 1:
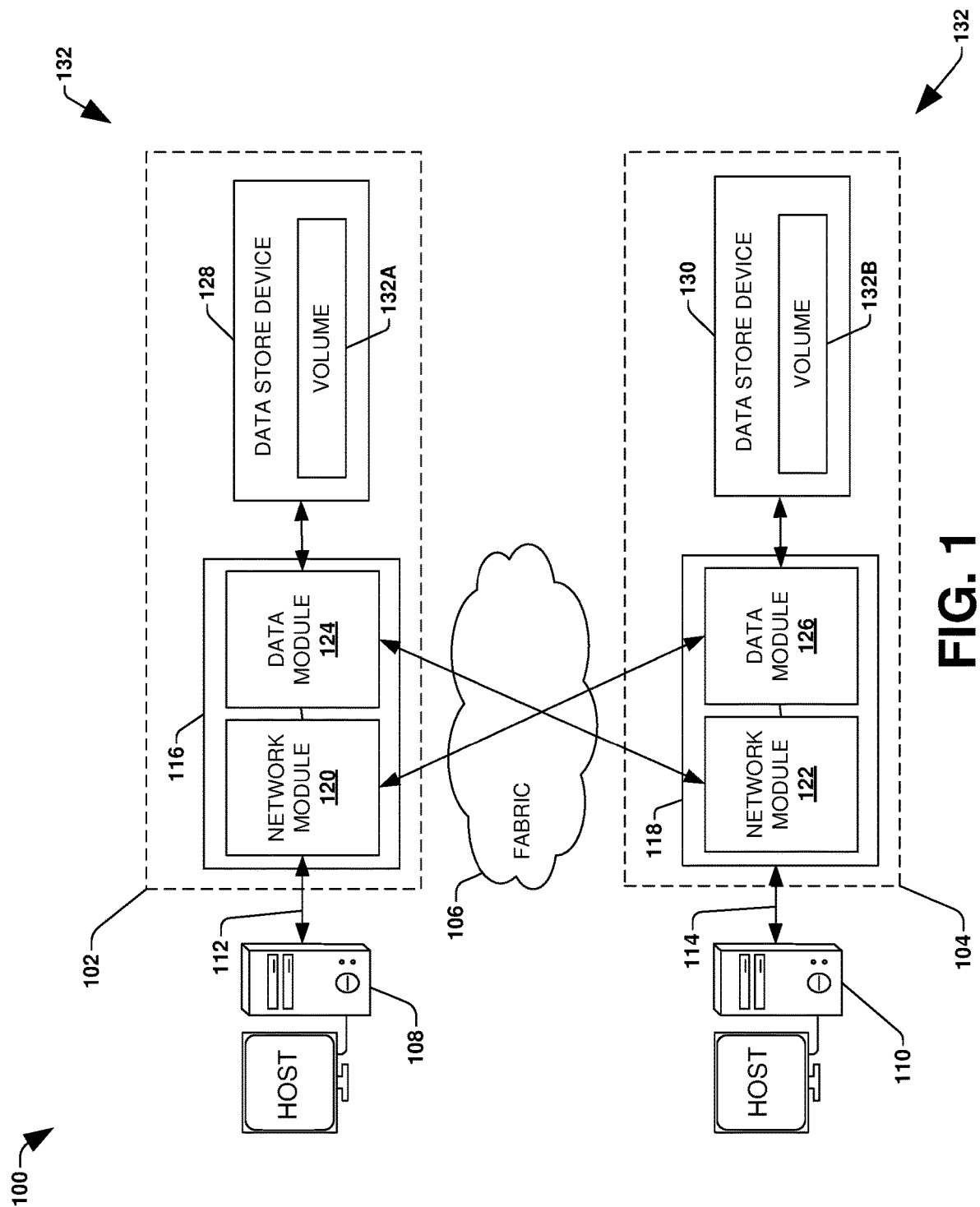
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for dynamic resource allocation based upon network flow control are provided. For example, a storage process may be identified as being configured to transmit data through a network interface over a network communication channel from a source storage computing device to a destination storage computing device (e.g., a replication storage process that replicates a file system from the source storage computing device to the destination storage computing device). Network flow control information, such as communication availability signals (e.g., the network interface may have available bandwidth for transmitting data, but the storage process may not have available data to send) or communication unavailability signals (e.g., the network interface may provide a data transmission request denial message due to the network communication channel being occupied), may be used to dynamically allocate resources to the storage process during execution of the storage process. In an example, a communication availability signal may arise when a storage application has transferred data to a communication system, and there is no further data to be sent. In another example, a communication unavailability signal may arise when the storage application attempts to write to the communication system using a new outgoing message, but is instructed that the new outgoing message cannot be buffered. In this way, a variety of dynamic factors (e.g., changes in network bandwidth; instantaneous variations introduced by gateway machines that may devote resources to other purposes than facilitating the transmission of data across a wide area network; etc.) may be considered when allocating resources to storage processes (e.g., during a low network usage period where more network bandwidth is available, more memory and CPU cycles may be allocated to the replication storage process so that the replication storage process may produce replication data more quickly for transmission, which may efficiently utilize available network bandwidth). Thus, more computing resources may be provided to a storage process so that the storage process may execute more quickly and more efficiently when there is available network resources for use by the storage process. In contrast, less computing resources may be provided to the storage process when the storage process is bottlenecked by a lack of network resources and thus the computing resources may be more efficiently utilize by other applications, services, and processes such as for processing client I/O requests. Dynamically adjusting resources allocations based upon network flow control information may provide more precise resource allocations that may be adjusted in real-time responsive to changes in network resource availability, and thus resource allocation may be more accurate and efficient than merely estimating resource allocations based upon theoretical performance information or historic data.

To provide context for dynamic resource allocation based upon network flow control, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that dynamic resource allocation based upon network flow control may be implemented within the clustered network environment 100. For example, resources of the node 116 and/or the node 118 may be dynamically adjusted for storage processes executing thereon based upon network flow control information, such as communication availability and unavailability signals from the network module 120 and/or the network module 122. It may be appreciated that dynamic resource allocation based upon network flow control may be implemented for and/or between any type of computing environment, and may be transferrable between physical devices (e.g., node 116, node 118, etc.) and/or a cloud computing environment (e.g., remote to the clustered network environment 100).

Figure 2:
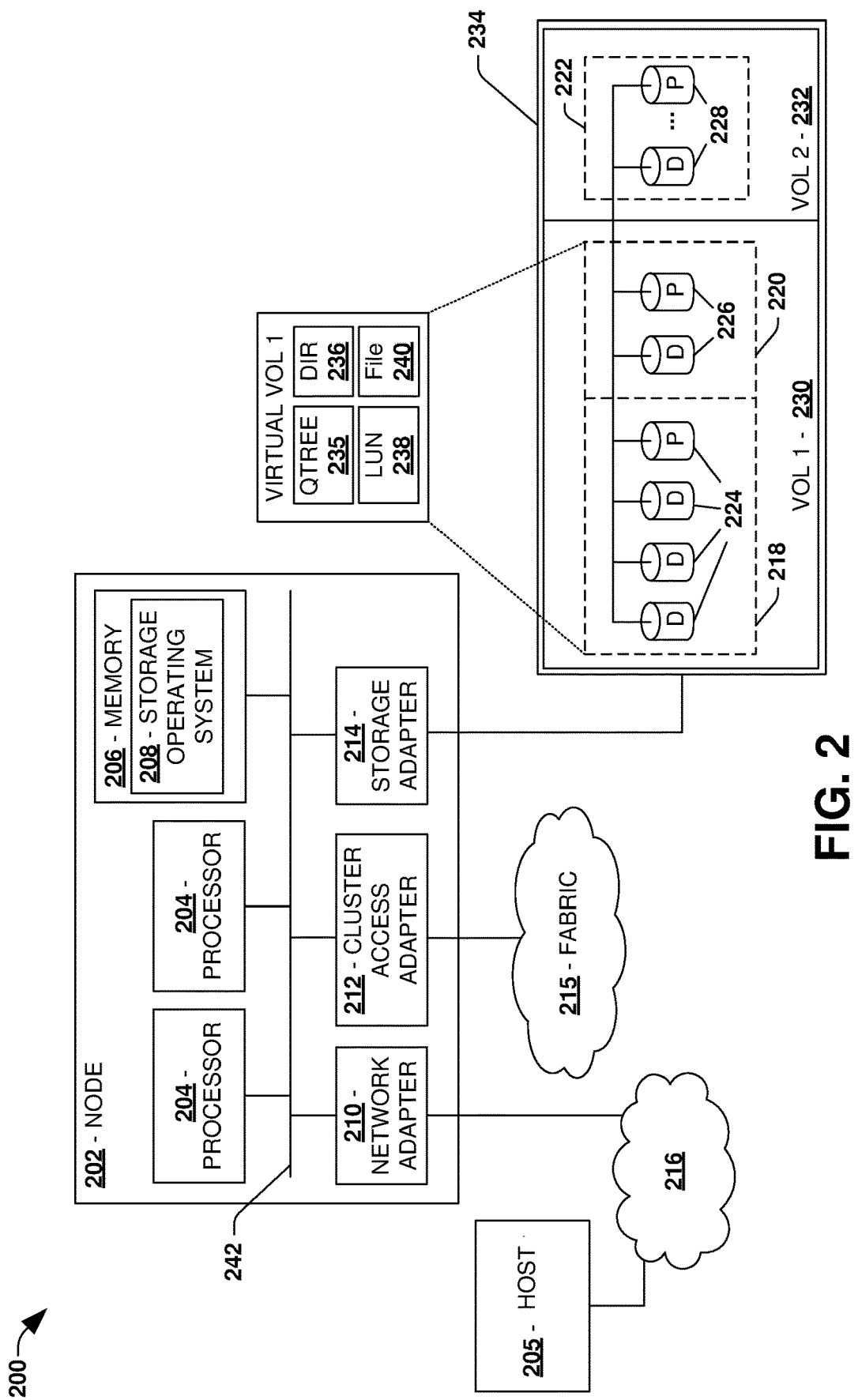
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234

(e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that dynamic resource allocation based upon network flow control may be implemented for the data storage system 200. For example, resources of the node 202 may be dynamically adjusted for storage processes executing thereon based upon network flow control information, such as communication availability and unavailability signals from the network adapter 210. It may be appreciated that dynamic resource allocation based upon network flow control may be implemented for and/or between any type of computing environment, and may be transferrable between physical devices (e.g., node 202, host 205, etc.) and/or a cloud computing environment (e.g., remote to the node 202 and/or the host 205).

Figure 3:
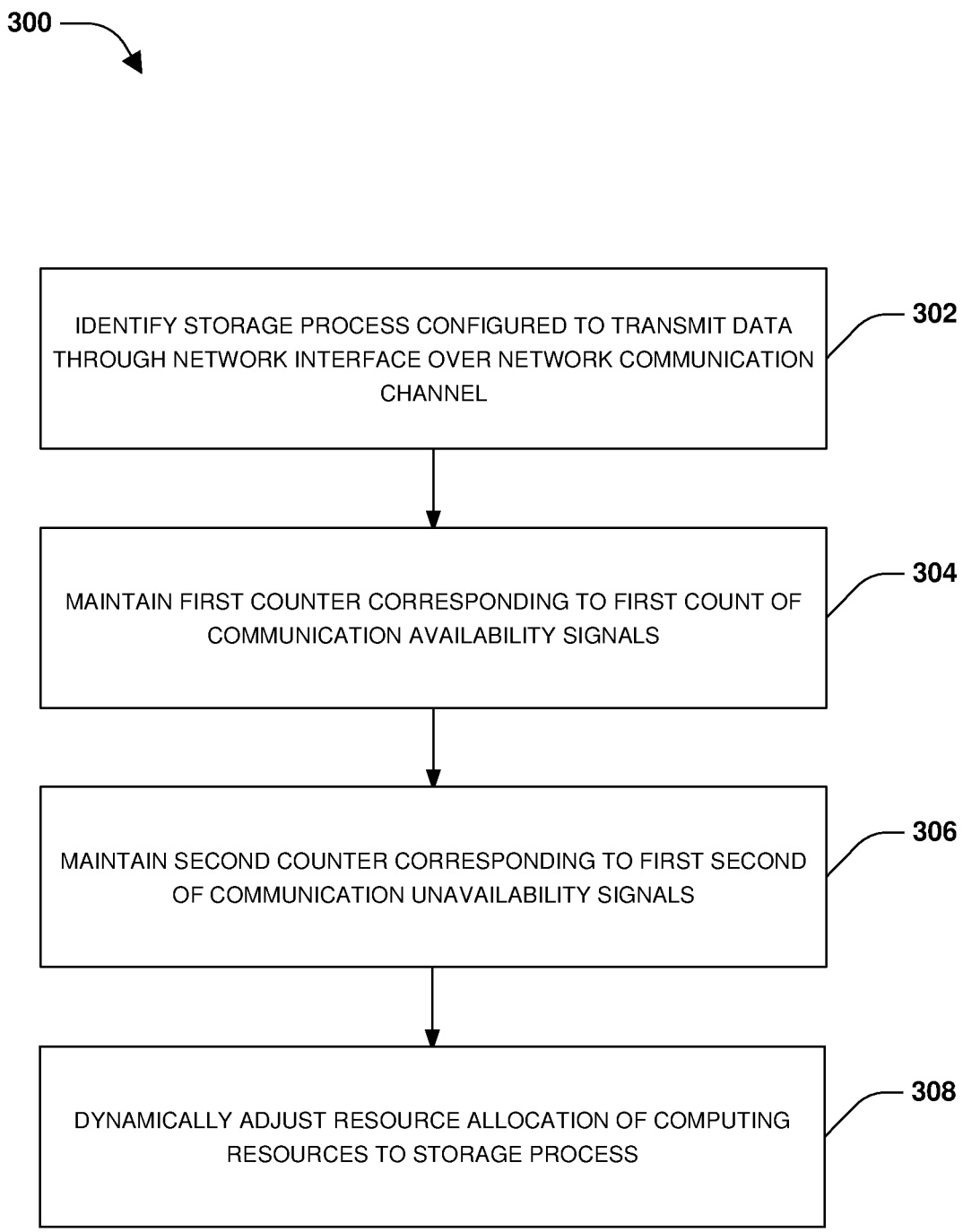
FIG. 3 is a flow chart illustrating an exemplary method of dynamic resource allocation based upon network flow control.

One embodiment of dynamic resource allocation based upon network flow control is illustrated by an exemplary method 300 of FIG. 3. At 302, a storage process may be identified (e.g., by a storage server) as being configured to transmit data through a network interface (e.g., a network layer) over a network communication channel from a source storage computing device hosting the storage process (e.g., the storage server) to a destination storage computing device. It may be appreciated that a storage computing device may be any computing device configured to store, transmit, and/or receive data (e.g., the storage server, a node, a storage controller, a laptop, a personal computer, a mobile device, a smart device, a cloud computing environment, etc.). The storage process may comprise a replication storage process, a data mirroring storage progress, a media scanner storage process (e.g., a process that evaluates and/or formats data), a compression storage process, a snapshot storage process, and/or any other process, application, or service that may process data and send the processed data to another computing device.

In an example, a first counter, corresponding to a first count of communication availability signals provided by the network interface to the storage process, may be maintained, at 304. In another example, a communication availability indicator (e.g., a data structure used to store information regarding communication availability, a real-time evaluation of a communication availability signal, or any other data or algorithm capable of absorbing feedback associated with availability and/or unavailability signals from the network interface), corresponding to one or more communication availability signals, may be maintained (e.g., instead of the first counter). A communication availability signal may correspond to a message from the network interface (e.g., a particular network layer) that the network communication channel is unoccupied and is available for transmitting data. The first count may be indicative of the storage process not being allocated an adequate amount of computing resources for processing data at a rate that efficiently utilizes the network communication channel (e.g., a buffer may be empty when the communication availability signal is received). In an example, a second counter, corresponding to a second count of communication unavailability signals sent by the network interface to the storage process in response to data transmission requests sent by the storage process to the network interface, may be maintained, at 306. In another example, a communication unavailability indicator (e.g., a data structure used to store information regarding communication unavailability, a real-time evaluation of a communication unavailability signal, or any other data or algorithm capable of absorbing feedback associated with availability and/or unavailability signals from the network interface), corresponding to one or more communication unavailability signals, may be maintained (e.g., instead of the second counter). A communication unavailability signal may correspond to a write error message (e.g., an error when the storage process attempts to write data over the network communication channel), a thread suspension event (e.g., a data transmission thread may be suspended when the network communication channel is occupied), a network communication channel occupied message, a data transmission request denial message (e.g., the network interface may deny a data transmission request to send data over the network communication channel because the network communication channel is occupied), and/or other network layer messages. The second count may be indicative of the storage process being allocated too much computing resources because the storage process may be preparing data for transmission at a faster rate than what the network communication channel can support (e.g., the network communication channel may be a bottleneck, such as due to gateway computing devices of a wide area network devoting resources to other purposes than transmitting data, thus resulting in instantaneous variations such as slowdowns in data transmission).

In an example of maintaining the counters, a communication availability signal, indicating that the network communication channel is available for transmitting data, may be identified. The first count of the first counter may be incremented based upon the communication availability signal. The second count of the second counter may be decremented or reset (e.g., set to a base value such as 0) based upon the communication availability signal. In an example, the first count may be incremented and the second count may be decremented or reset if the storage process did not have data available to transmit as a data transmission request in response to the communication availability signal (e.g., an indication that the storage process could use additional resources for preparing data for transmission, thus better utilizing the available bandwidth of the network communication channel). In another example, the first count may not be incremented and the second count may not be decremented or reset if the storage process had data available to transmit (e.g., an indication that the storage process is preparing data at a rate that fruitfully utilizes the available bandwidth of the network communication channel).

In an example of maintaining the counters, a communication unavailability signal, indicating that the network communication channel is unavailable for transmitting data of a data transmission request, may be identified. The second count of the second counter may be incremented based upon the communication unavailability signal. The first count of the first counter may be decremented or reset (e.g., set to a base value such as 0) based upon the communication unavailability signal.

In an example, a resource allocation of computing resources of the source storage computing device to the storage process may be dynamically adjusted during real-time operation of the storage process based upon the first counter and the second counter, at 308. For example, a resource allocation threshold, used to trigger a dynamic increase of resource allocation for the storage process, may be defined for the first counter. A resource deallocation threshold, used to trigger a dynamic decrease of resource allocation for the storage process, may be defined for the second counter. Responsive to the first count of the first counter exceeding the resource allocation threshold (e.g., a count of 15 or any other number) and the second counter of the second counter not exceeding a threshold (e.g., a count of 0, 7, or any other number), an increase in computing resources may be allocated (e.g., an increase in a size of a buffer used by the storage process). Responsive to the second count of the second counter exceeding the resource deallocation threshold (e.g., a count of 10 or any other number) and the first counter of the first counter not exceeding a threshold (e.g., a count of 0, 3, or any other number), a decrease in computing resources may be performed (e.g., a decrease in the size of the buffer used by the storage process). In another example, the resource allocation may be dynamically adjusted based upon the communication availability indicator and the communication unavailability indicator (e.g., real-time control of resource allocation based upon communication availability and unavailability signals from the network interface). In an example, the storage process and a second storage process hosted by the source storage computing device may have been initially allocated the same amount of computing resources, however, the resource allocation of the storage process may be adjusted such that the storage process and the second storage process may have different resource allocations.

Smoothing and/or hysteresis may be implemented for the adjusting of resource allocations. In an example of smoothing and/or hysteresis, the resource allocation for the storage process may be dynamically increased based upon the first count exceeding the resource allocation threshold. A threshold number of communication unavailability signals may be subsequently received after the resource allocation increase, which may be indicative of the storage process being allocated too many resources such that the storage process is processing data too quickly for transmission in relation to availability of the network communication channel. Accordingly, the resource allocation threshold may be adjusted (e.g., changed from 15 to 20) and/or an amount of computing resources used for increasing resource allocations may be adjusted (e.g., as opposed to adding an additional 50 MB of memory for increasing resource allocations, merely 25 MB of memory may be allocated for increasing resource allocations).

In another example of smoothing and/or hysteresis, the resource allocation for the storage process may be dynamically decreased based upon the second count exceeding the resource deallocation threshold. A threshold number of communication availability signals may be subsequently received after the resource allocation decrease, which may be indicative of the storage process being allocated too few resources such that the storage process is not processing data fast enough to fully utilize availability of the network communication channel. Accordingly, the resource deallocation threshold may be adjusted (e.g., changed from 10 to 18) and/or an amount of computing resources used for decreasing resource allocations may be adjusted (e.g., as opposed to removing 50 MB of memory for decreasing resource allocations, merely 10 MB of memory may be removed for decreasing resource allocations).

Figure 4A:
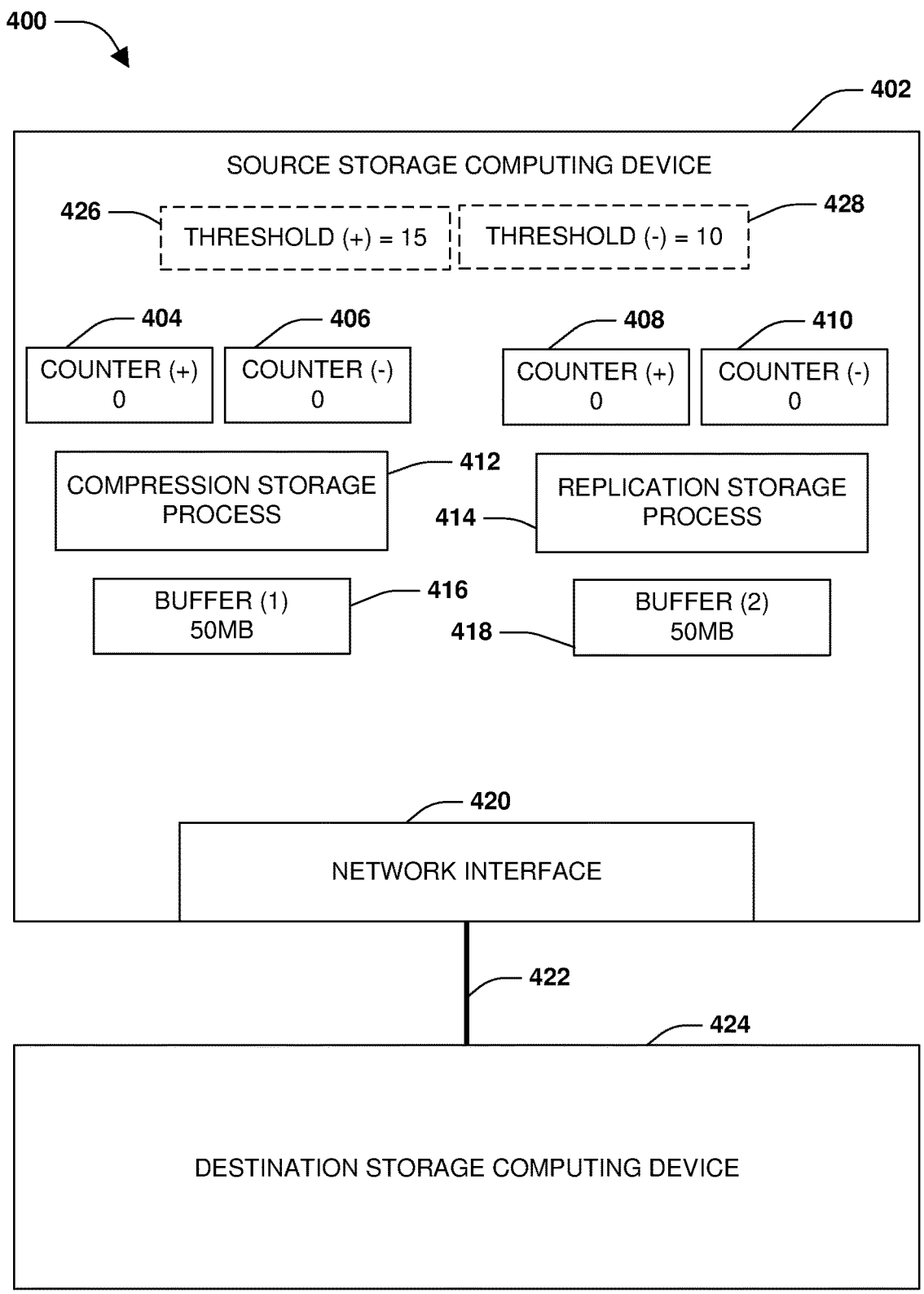
FIG. 4A is a component block diagram illustrating an exemplary computing device for dynamic resource allocation based upon network flow control.

FIGS. 4A-4G illustrate examples of a computing device 400 for dynamic resource allocation based upon network flow control. FIG. 4A illustrates a source storage computing device 402 hosting a compression storage process 412 and a replication storage process 414 that are configured to process and send data, through a network interface 420 over a network communication channel 422, from the source storage computing device 402 to a destination storage computing device 424. The compression storage process 412 may be initially allocated 50 MB of memory to use as a first buffer 416, CPU cycle time, and/or other resources. The replication storage process 414 may be initially allocated 50 MB of memory to use as a second buffer 418, CPU cycle time, and/or other resources.

A first counter 404, corresponding to a first count of communication availability signals provided by the network interface 420 to the compression storage process 412, may be maintained. A second counter 406, corresponding to a second count of communication unavailability signals provided by the network interface 420 to the compression storage process 412 in response to data transmission requests sent by the compression storage process 412 to the network interface 420, may be maintained. A third counter 408, corresponding to a third count of communication availability signals provided by the network interface 420 to the replication storage process 414, may be maintained. A fourth counter 410, corresponding to a fourth count of communication unavailability signals provided by the network interface 420 to the replication storage process 414 in response to data transmission requests sent by the replication storage process 414 to the network interface 420, may be maintained.

A resource allocation threshold 426 (e.g., a count of 15), used to trigger a dynamic increase of resource allocation for the compression storage process 412 and/or the replication storage process 414, may be maintained for the first counter 404 and the third counter 408. A resource deallocation threshold 428 (e.g., a count of 10), used to trigger a dynamic decrease of resource allocation for the compression storage process 412 and/or the replication storage process 414, may be maintained for the second counter 406 and the fourth counter 410.

Figure 4B:
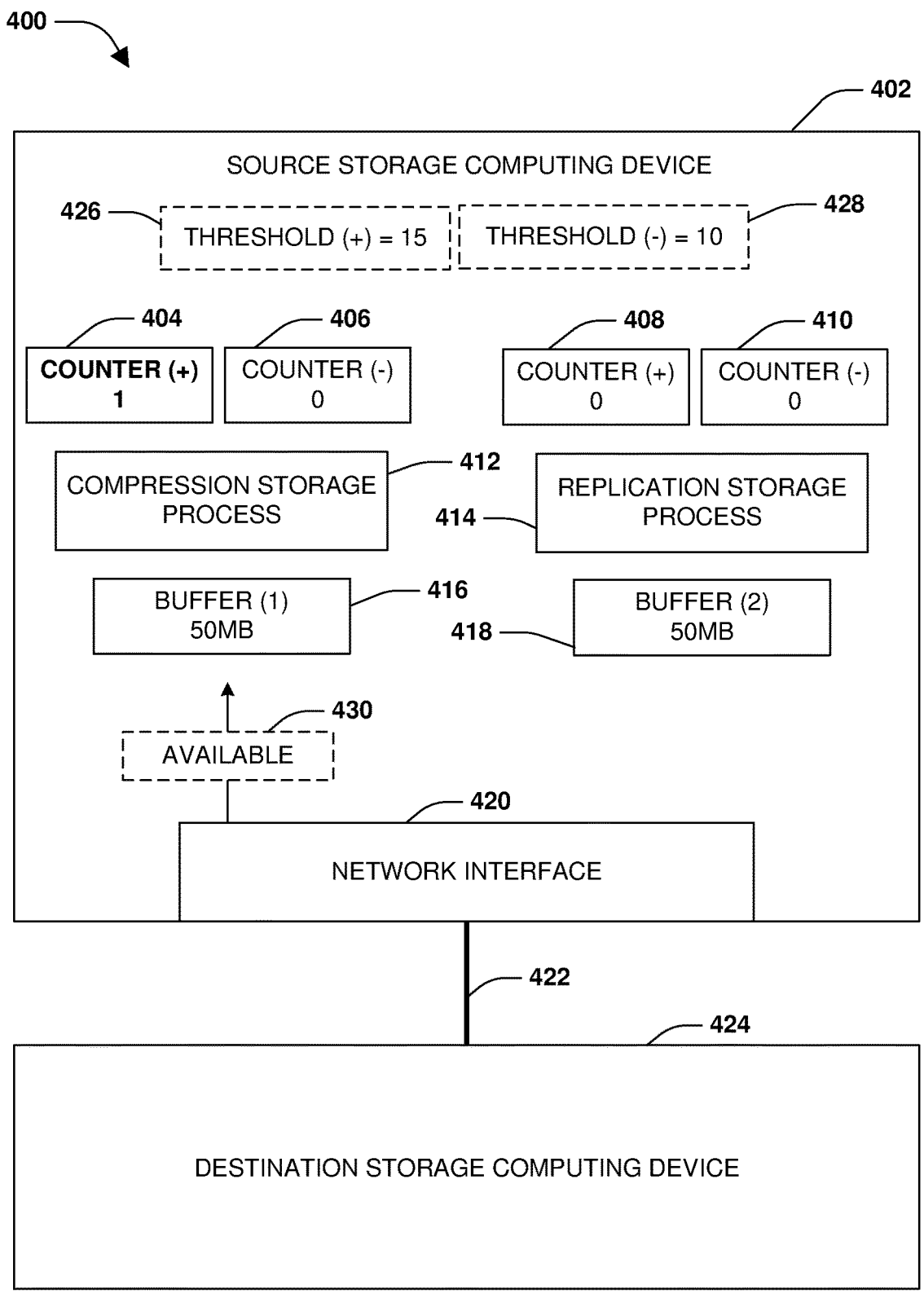
FIG. 4B is a component block diagram illustrating an exemplary computing device for dynamic resource allocation based upon network flow control, where a communication availability signal is received.

FIG. 4B illustrates the network interface 420 sending a communication availability signal 430 to the compression storage process 412. The communication availability signal 430 may indicate that the network communication channel 422 is unoccupied and available for transmitting data to the destination storage computing device 424. Because the first buffer 416 may lack data for the compression storage process 412 to send as a data transmission request in response to the communication availability signal 430, the first count of the first counter 404 may be incremented from 0 to 1 to indicate that the compression storage process 412 may be able to utilize more computing resources for processing data for transmission in order to more effectively utilize availability of the network communication channel 422.

Figure 4C:
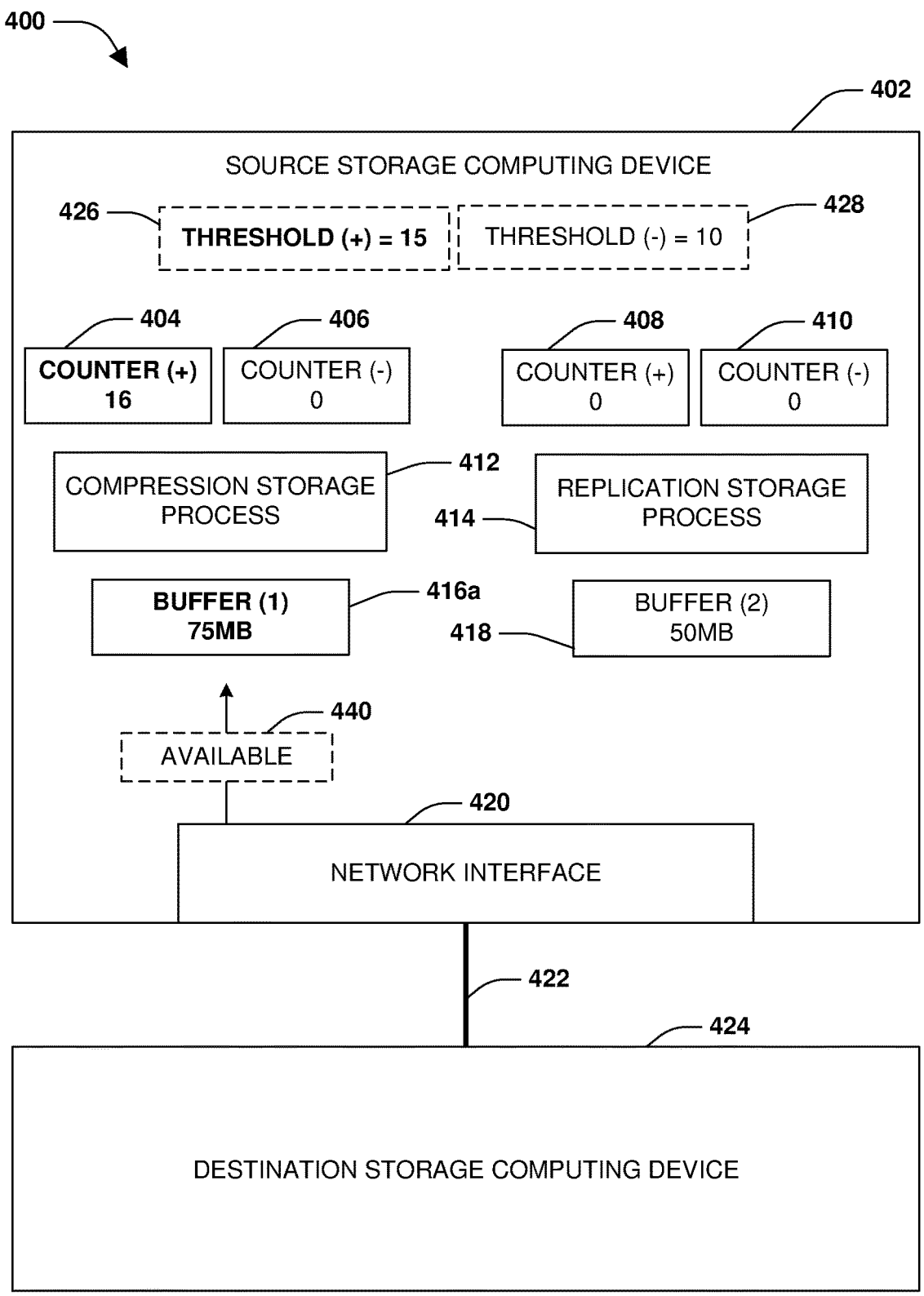
FIG. 4C is a component block diagram illustrating an exemplary computing device for dynamic resource allocation based upon network flow control, where resource allocation to a compression storage process is increased.

FIG. 4C illustrates the first count of 16 exceeding the resource allocation threshold 426 based upon receipt of one or more communication availability signals 440 from the network interface 420 for the compression storage process 412. Accordingly, additional computing resources (e.g., an increase in the CPU cycle time, an increased execution priority, increased memory, etc.) may be allocated to the compression storage process 412. For example, a size of the first buffer 416 may be increased from 50 MB to 75 MB, resulting in an increased first buffer 416a. In this way, the compression storage process 412 may utilize the increased first buffer 416a, increased CPU cycle time, increased execution priority, and/or other increases in resources for processing data at a rate that may more effectively utilize availability of the network communication channel 422. The first count may be reset to 0, as illustrated in FIG. 4D, based upon the increased allocation of computing resources.

Figure 4D:
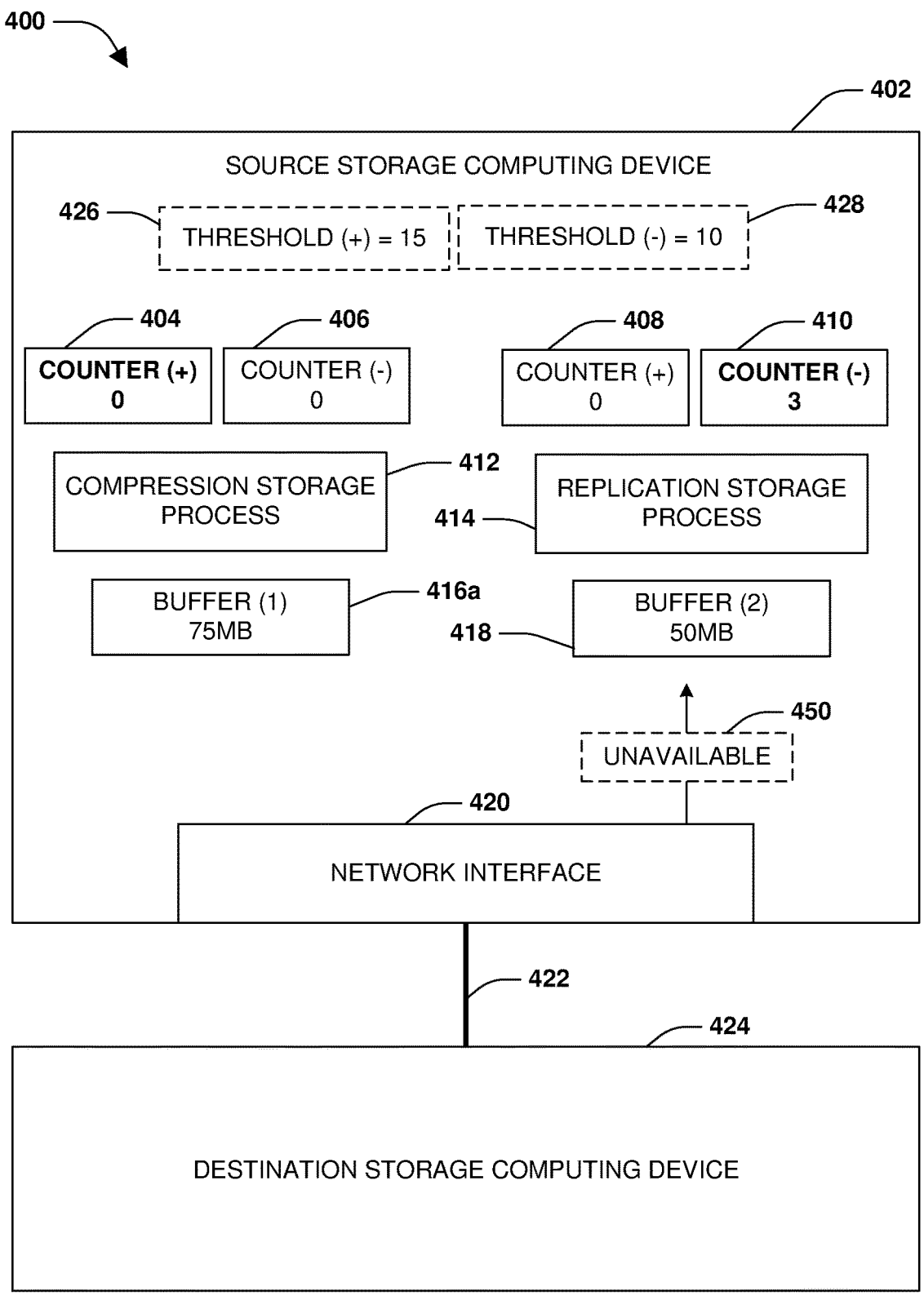
FIG. 4D is a component block diagram illustrating an exemplary computing device for dynamic resource allocation based upon network flow control, where a communication unavailability signal is received.

FIG. 4D illustrates the network interface 420 sending communication unavailability signals 450 to the replication storage process 414 in response to data transmission requests sent by the replication storage process 414 to the network interface 420. The communication unavailability signals 450 may indicate that the network communication channel 422 is occupied and unavailable for transmitting data to the destination storage computing device 424. The fourth count of the fourth counter 410 may be incremented to 3 (e.g., based upon receiving 3 communication unavailability signals) to indicate that the replication storage process 414 could have been allocated more computing resources than needed for the replication storage process 414 to fruitfully utilize the network communication channel 422, and thus the some of the allocated computing resources may be better utilized if reallocated to other processes such as for servicing client I/O requests.

Figure 4E:
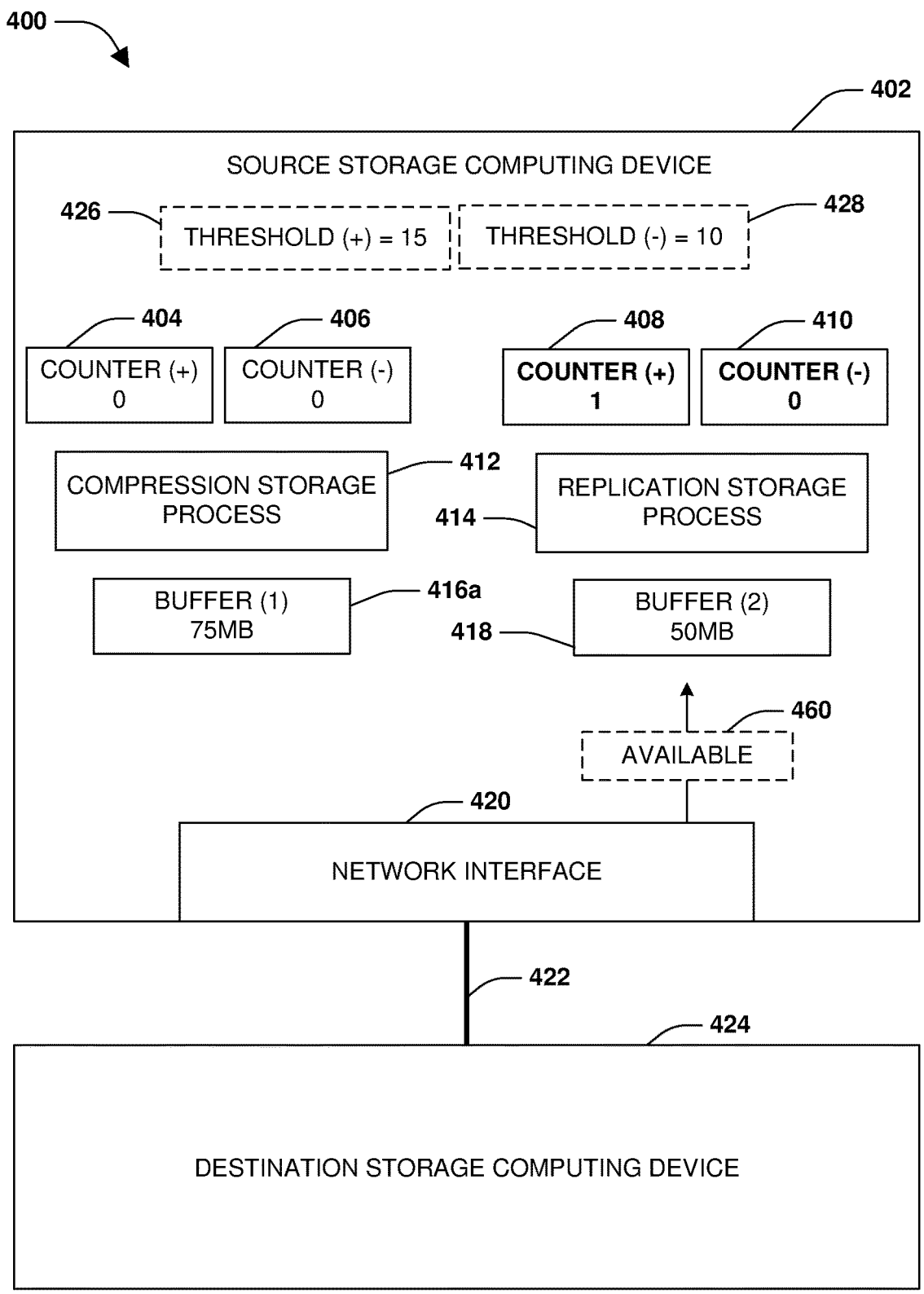
FIG. 4E is a component block diagram illustrating an exemplary computing device for dynamic resource allocation based upon network flow control, where a communication availability signal is received.

FIG. 4E illustrates the network interface 420 sending a communication availability signal 460 to the replication storage process 414. The third count of the third counter 408 may be incremented based upon the communication availability signal 460. The fourth count of the fourth counter 410 may be reset to 0 based upon the communication availability signal 460 since the fourth counter 410 corresponds to counts of communication unavailability signals as opposed to communication availability signals.

Figure 4F:
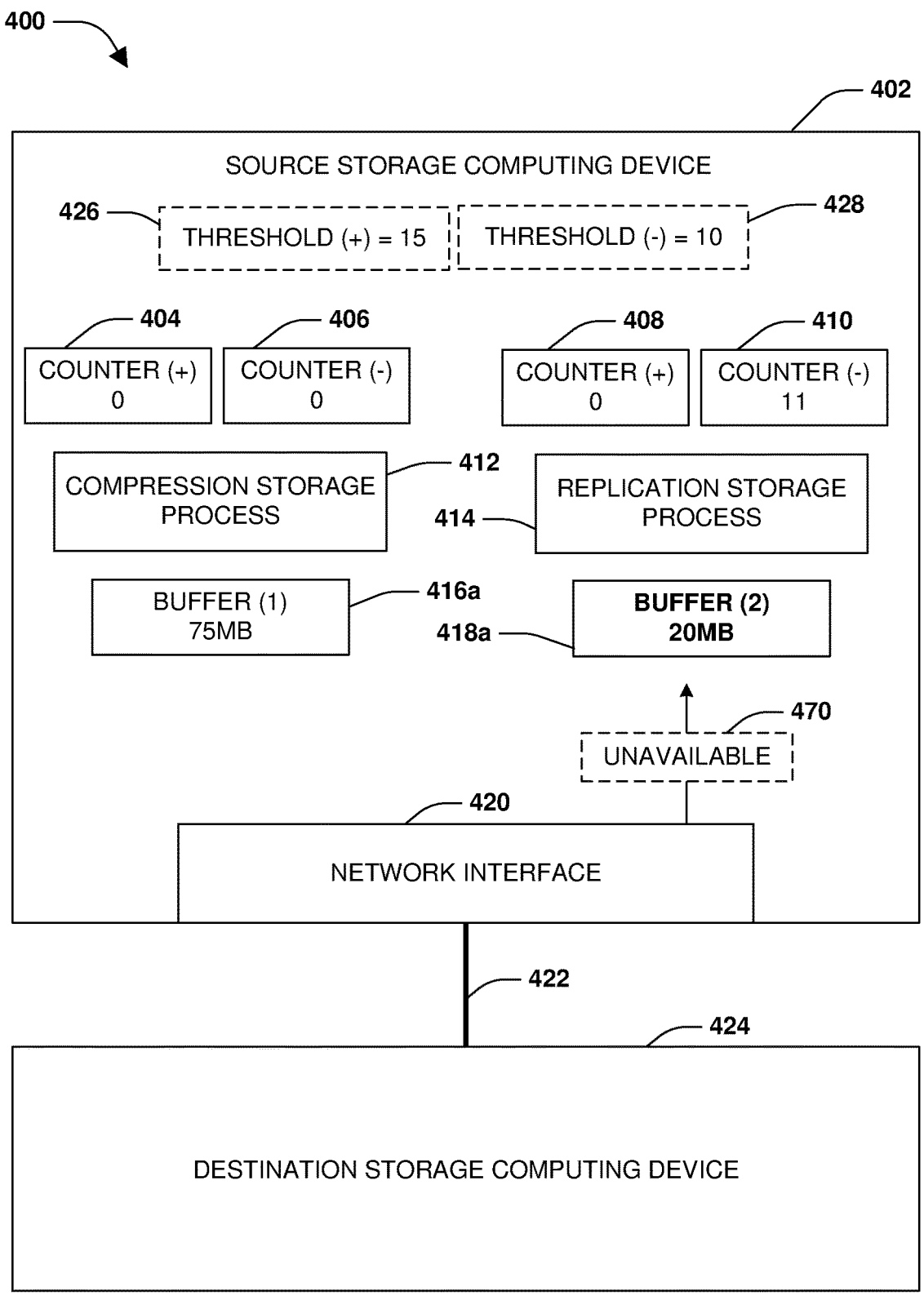
FIG. 4F is a component block diagram illustrating an exemplary computing device for dynamic resource allocation based upon network flow control, where resource allocation to a replication storage process is decreased.

FIG. 4F illustrates the fourth count of 11 exceeding the resource deallocation threshold 428 based upon receipt of one or more communication unavailability signals 470 from the network interface 420 for the replication storage process 414. Accordingly, computing resources may be deallocated from the replication storage process 414 (e.g., decreased CPU cycles, decreased memory, etc.). For example, a size of the second buffer 418 may be decreased from 50 MB to 20 MB, resulting in a decreased second buffer 418a. In this way, the deallocated resources may be reallocated to other process, applications, and/or services of the source storage computing device 402 because the replication storage process 414 could not fruitfully utilizes the computing resources due to the network communication channel 422 being a bottleneck. The fourth count may be reset to 0, as illustrated in FIG. 4G, based upon the decreased allocation of computing resources.

Figure 4G:
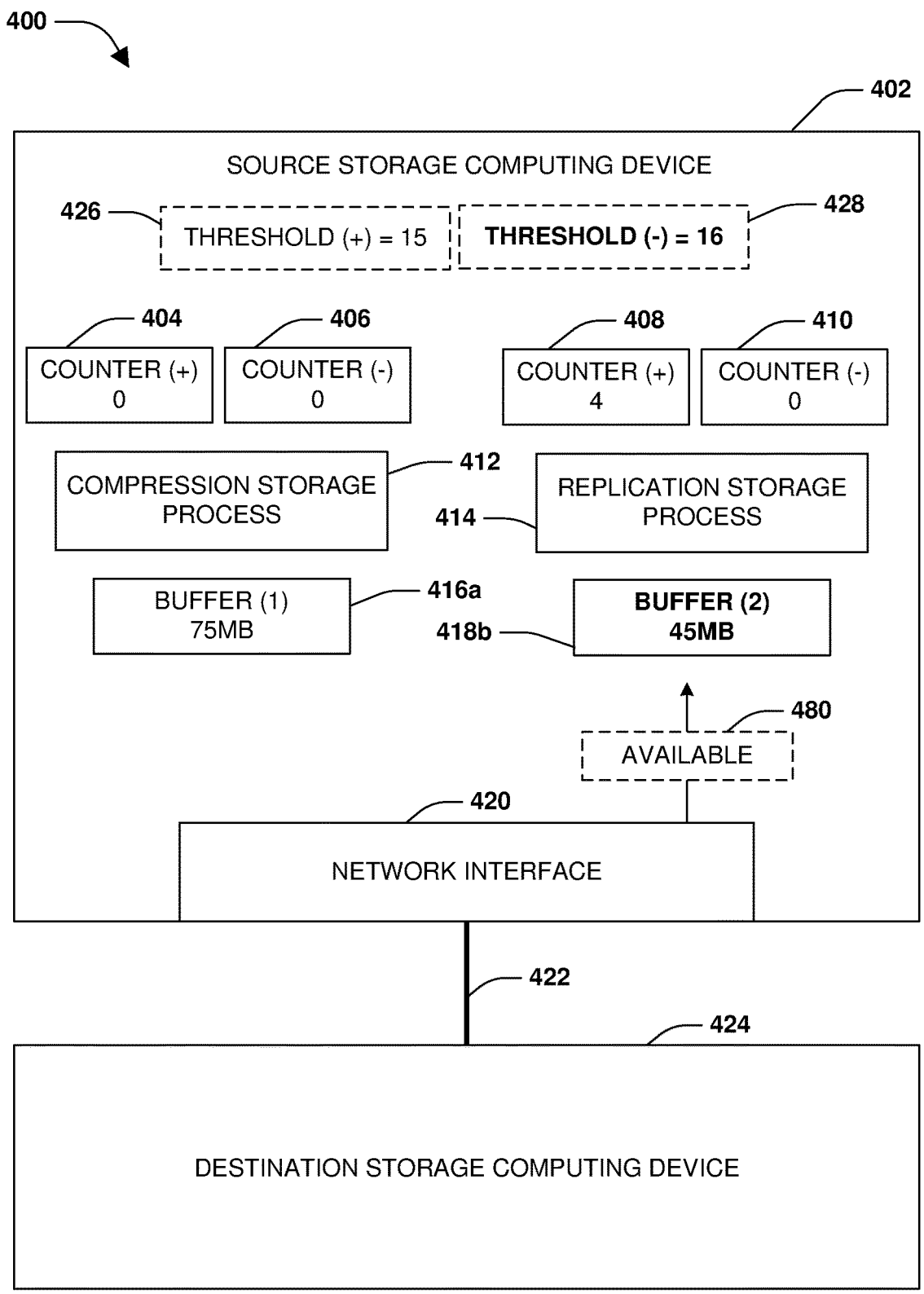
FIG. 4G is a component block diagram illustrating an exemplary computing device for dynamic resource allocation based upon network flow control, where a resource deallocation threshold is adjusted.

FIG. 4G illustrates the resource deallocation threshold 428 being modified based upon a threshold number of communication availability signals 480 being received after the decrease in computing resources for the replication storage process 414. Because the communication availability signals 480 may indicate that too many computing resources were deallocated from the replication storage process 414, the resource deallocation threshold 428 may be increased from 10 to 16 (e.g., based upon various smoothing and/or hysteresis policies) so that triggering of resource deallocation may be desensitized. The amount of resource deallocation may be adjusted (e.g., based upon various smoothing and/or hysteresis policies) such as from a decrease of 25 MB to a decrease of 5 MB. For example, the decreased second buffer 418 may be set to 45 MB, resulting in an adjusted second buffer 418b. In this way, the replications storage process 414 may have an efficient allocation of computing resources for fruitfully utilizing network bandwidth of the network communication channel 422.

Figure 5:
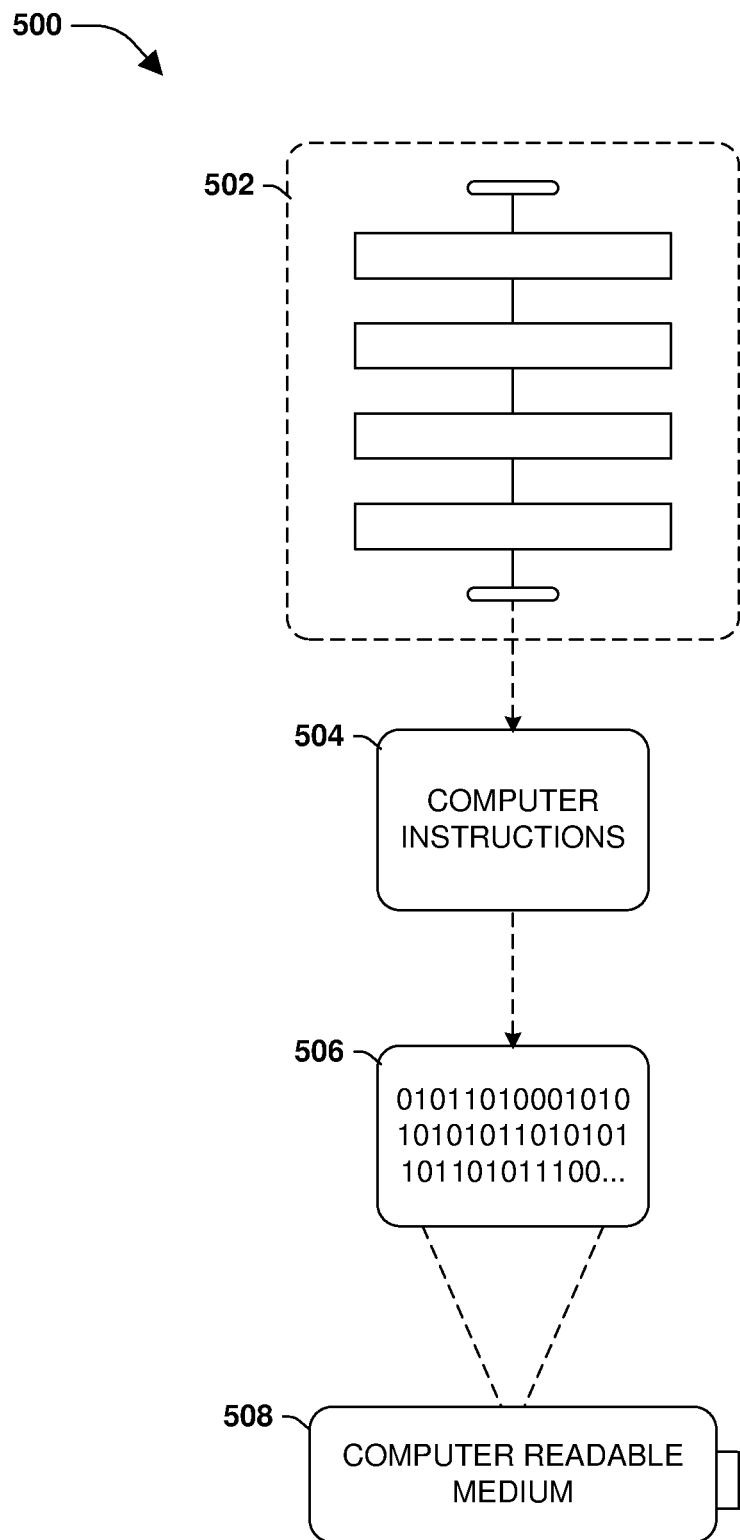
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-ft DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable instructions 504 are configured to implement a system, such as at least some of the exemplary system 400 of FIGS. 4A-4G, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   maintaining a first counter corresponding to a first count of communication availability signals provided by a network interface to a process;
   maintaining a second counter corresponding to a second count of communication unavailability signals provided by the network interface to the process for data transmission requests sent by the process to the network interface; and
   dynamically adjusting a resource allocation of computing resources to the process during real-time operation of the process based upon the first counter and the second counter.

2. The method of claim 1, the dynamically adjusting a resource allocation of computing resources comprising:
   increasing the resource allocation based upon the first count of the first counter exceeding a resource allocation threshold and the second count of the second counter not exceeding a threshold.

3. The method of claim 1, the dynamically adjusting a resource allocation of computing resources comprising:
   decreasing the resource allocation based upon the second count of the second counter exceeding a resource deallocation threshold and the first count of the first counter not exceeding a threshold.

4. The method of claim 1, comprising:
   identifying a communication availability signal provided by the network interface, the communication availability signal indicating that a network communication channel is available for transmitting data, wherein the first count of the first counter is incremented based upon the communication availability signal.

5. The method of claim 4, comprising:
   decrementing the second count of the second counter based upon the communication availability signal.

6. The method of claim 4, the incrementing comprising:
   refraining from incrementing the first count of the first counter based upon the process having data available to transmit in response to the communication availability signal, wherein the first count of the first counter is incremented based upon the process lacking data available to transmit in response to the communication availability signal.

7. The method of claim 1, comprising:
identifying a communication unavailability signal provided by the network interface, the communication unavailability signal indicating that a network communication channel is unavailable for transmitting data of a data transmission request, wherein the second count of the second counter is incremented based upon the communication unavailability signal.

8. The method of claim 7, comprising:
decrementing the first count of the first counter based upon the communication unavailability signal.

9. The method of claim 1, the dynamically adjusting a resource allocation of computing resources comprising:
modifying an allocation of memory to adjust a size of a buffer used by the process.

10. The method of claim 1, comprising:
defining, for the first counter, a resource allocation threshold used to trigger a dynamic increase of resource allocation for the process and a resource deallocation threshold, for the second counter, used to trigger a dynamic decrease of resource allocation for the process.

11. The method of claim 10, comprising:
dynamically increasing resource allocation for the process based upon the first count exceeding the resource allocation threshold.

12. The method of claim 10, comprising:
dynamically decreasing resource allocation for the process based upon the second count exceeding the resource deallocation threshold.

13. The method of claim 10, comprising:
dynamically increasing resource allocation for the process based upon the first count exceeding the resource allocation threshold.

14. The method of claim 10, comprising:
dynamically decreasing resource allocation for the process based upon the second count exceeding the resource deallocation threshold.

15. The method of claim 1, wherein the process is initially allocated a first amount of computing resources and a second process is initially allocated a second amount of computing resources equal to the first amount of computing resources, and the dynamically adjusting comprising:
adjusting the first amount of computing resources to a new amount of computing resources different than the second amount of computing resources.

16. A non-transitory machine readable medium having stored thereon instructions, which when executed by a processor, causes the processor to:
maintain a first counter corresponding to a first count of communication availability signals provided by a network interface to a process;
maintain a second counter corresponding to a second count of communication unavailability signals provided by the network interface to the process for data transmission requests sent by the process to the network interface; and
dynamically adjust a resource allocation of computing resources to the process during real-time operation of the process based upon the first counter and the second counter.

17. A computing device, comprising:
a memory having stored thereon instructions for performing a method;
a processor coupled to the memory, the processor configured to execute the instructions to cause the processor to:
maintain a first counter corresponding to a first count of communication availability signals provided by a network interface to a process;
maintain a second counter corresponding to a second count of communication unavailability signals provided by the network interface to the process for data transmission requests sent by the process to the network interface; and
dynamically adjust a resource allocation of computing resources to the process during real-time operation of the process based upon the first counter and the second counter.

18. The computing device of claim 17, wherein the instructions cause the processor to:
increase the resource allocation based upon a communication availability indicator.

19. The computing device of claim 17, wherein the instructions cause the processor to:
identify a communication availability signal provided by the network interface, the communication availability signal indicating that a network communication channel is available for transmitting data.

20. The computing device of claim 17, wherein the instructions cause the processor to:
identify a communication unavailability signal provided by the network interface, the communication unavailability signal indicating that a network communication channel is unavailable for transmitting data of a data transmission request.

* * * * *